United States Patent
Gorman et al.

(10) Patent No.: US 6,711,417 B1
(45) Date of Patent: Mar. 23, 2004

(54) INTERFACE USING AN ISH AND A SERVICE MANAGER

(75) Inventors: Bryan Gorman, Mission, KS (US); David A. Rush, Merriam, KS (US); Robert Wiese, Liberty, MO (US)

(73) Assignee: Sprint Spectrum, L.P., Overland Park, KS (US)

( * ) Notice: Subject to any disclaimer, the term of this patent is extended or adjusted under 35 U.S.C. 154(b) by 396 days.

(21) Appl. No.: 09/639,720

(22) Filed: Aug. 16, 2000

(51) Int. Cl.[7] .............................................. H04B 1/034
(52) U.S. Cl. ................................ 455/550.1; 455/556.1; 455/560; 370/359.52; 370/359.53; 370/359.5
(58) Field of Search ................................ 455/436, 414, 455/456, 437, 438, 439, 444, 446, 445, 560, 550, 553.1, 554.1, 554.2, 554.3, 556.1, 561; 370/395.5, 395.51, 395.52, 395.53, 395.6, 395.61, 218, 352, 353

(56) References Cited

U.S. PATENT DOCUMENTS

| | | | |
|---|---|---|---|
| 5,592,470 A | * 1/1997 | Rudrapatna et al. | ........ 370/320 |
| 5,600,633 A | 2/1997 | Jaisingh et al. | ............. 370/277 |
| 5,630,204 A | 5/1997 | Hylton et al. | ................... 455/3 |
| 5,729,536 A | 3/1998 | Doshi et al. | ................. 370/398 |
| 5,761,286 A | * 6/1998 | Das et al. | ............. 379/127.06 |
| 5,774,689 A | * 6/1998 | Curtis et al. | ................... 703/21 |
| 5,889,816 A | * 3/1999 | Agrawal et al. | ............. 375/220 |
| 5,903,834 A | * 5/1999 | Wallstedt et al. | ........... 455/422 |
| 5,970,062 A | 10/1999 | Bauchot | ...................... 370/345 |
| 6,009,096 A | 12/1999 | Jaisingh et al. | ............. 370/395 |
| 6,018,521 A | 1/2000 | Timbs et al. | ................. 370/342 |
| 6,026,304 A | * 2/2000 | Hilsenrath et al. | .......... 455/456 |
| 6,028,933 A | 2/2000 | Heer et al. | ...................... 380/9 |
| 6,031,904 A | * 2/2000 | An et al. | ................ 379/201.02 |
| 6,049,593 A | * 4/2000 | Acampora | .................. 379/56.2 |
| 6,061,562 A | * 5/2000 | Martin et al. | ................ 455/431 |
| 6,216,000 B1 | * 4/2001 | Blumhardt | ................... 455/435 |
| 6,262,980 B1 | * 7/2001 | Leung et al. | ................ 370/336 |
| 6,272,334 B1 | * 8/2001 | Rao | ............................ 455/418 |
| 6,305,020 B1 | * 10/2001 | Hoarty et al. | ................. 725/95 |
| 6,330,443 B1 | * 12/2001 | Kirby | .......................... 455/432 |
| 6,393,290 B1 | * 5/2002 | Ufongene | ................... 455/446 |
| 6,407,997 B1 | * 6/2002 | DeNap et al. | .............. 370/352 |
| 6,574,470 B1 | * 6/2003 | Chow et al. | ................... 55/417 |

OTHER PUBLICATIONS

Bellcore, "Service Manager (SM) 1.0: ISUP Interface", BD–SM–ISUP–INT–1, Issue 1.1, Jan. 1999, pp. 1–210.
IS–41 Revision C Explained, "Basic Intersystem Handoff Functions", pp. 135–160.

\* cited by examiner

Primary Examiner—Congvan Tran

(57) ABSTRACT

An interface between a public switched telephone network (PSTN), a wireless communication network having a plurality of cells and a plurality of mobile switching centers (MSCs), and a wireless device. The interface includes a broadband telecommunications network. It also includes an integrated services hub (ISH). The ISH is communicatively coupled to the wireless device and the broadband network. The ISH receives RF communications from the wireless device and converts the RF communications into control and data signals usable by said broadband network. The ISH has an antenna with a first coverage area extending over a pico cell. The interface also comprises a service manager communicatively coupled to the broadband network, to the wireless network, and to the PSTN. The service manager receives the control and data signals from the ISH via the broadband network and forms and provides signaling communications in response to receiving the control and data signals. The signaling communications control the operation of switches in the PSTN. The service manager communicates with selected ones of the plurality of MSCs in the wireless network to perform hand-offs of the wireless device from the first coverage area to a selected one of the plurality of cells within the wireless network.

20 Claims, 7 Drawing Sheets

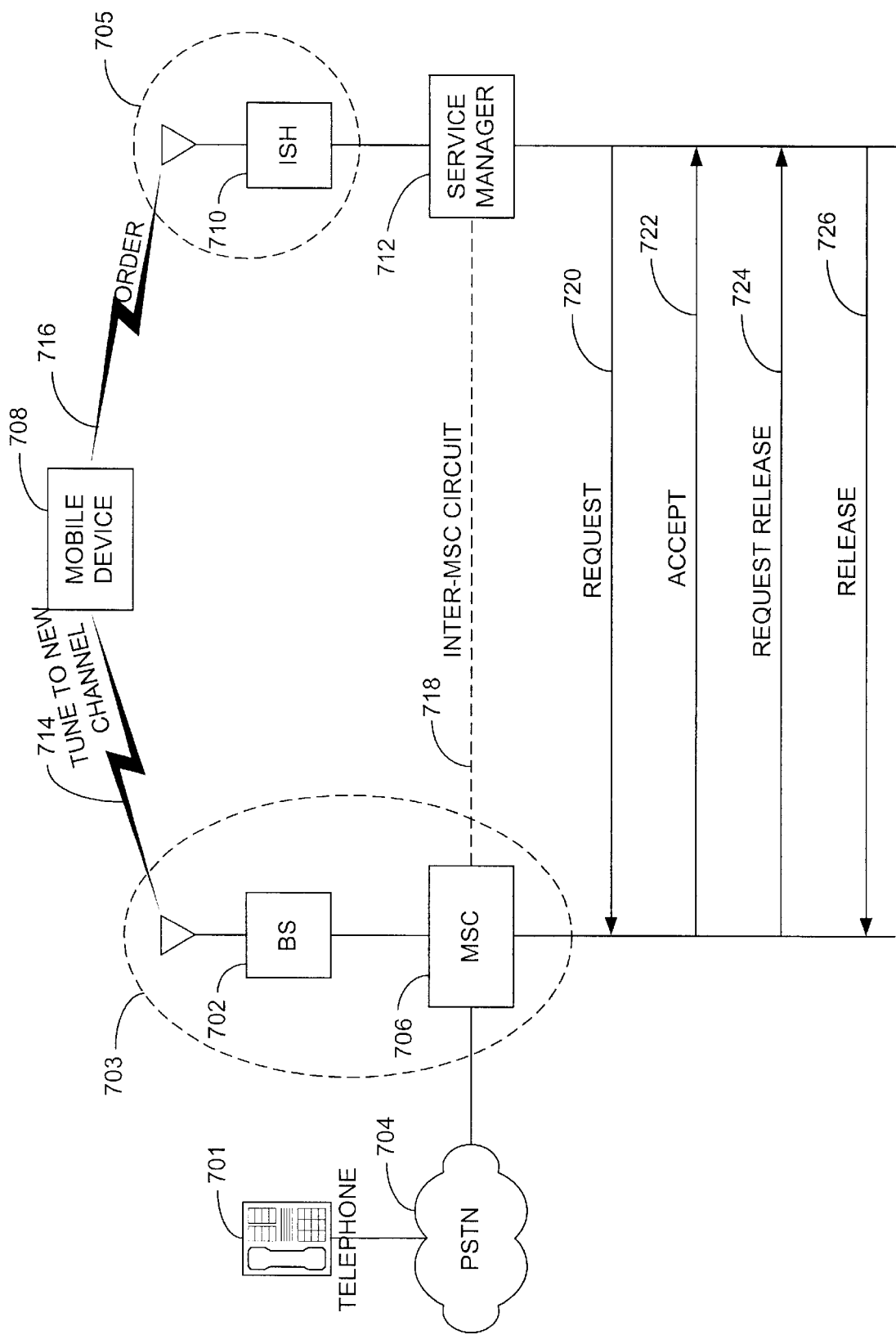

INTERFACE USING AN ISH AND A SERVICE MANAGER

BACKGROUND OF THE INVENTION

1. Field of the Invention

The present invention relates to wireless networks. More particularly, the invention relates to interfaces between networks that use an integrated services hub (ISH).

2. Description of Related Art

A variety of different types of networks exist in today's telecommunication environment. For example, a wireless telecommunication network represents one type of network. In wireless networks, switching is performed by mobile switching centers (MSCs). Each MSC typically controls one or more base stations or base transceiver stations (BTSs), sometimes via one or more base station controllers (BSCs). Each BTS provides a wireless coverage area, within which mobile stations can communicate with wireless devices over an air interface. The wireless devices can be cellular or PCS telephones, or other devices. Different formats may be used for communicating over the air interface. The most commonly used formats in the United States are AMPS, TDMA, and CDMA.

Each wireless device typically has a "home" wireless network, in which a home location register (HLR) serves as a centralized repository of information about the wireless device. Typically, the HLR contains a service profile for the wireless device, the last reported location of the wireless device, and the current status of the wireless device, such as whether it is inactive, active, or busy. The service profile indicates the services to which the wireless device subscribes. Typically, the HLR also has access to the service logic needed to provide the subscribed services.

When an MSC needs to find information about a wireless device, such as where the wireless device is located or the services to which the wireless device subscribes, the MSC queries the HLR corresponding to that wireless device. Thus, to inquire about a wireless device that is roaming, i.e., operating on a network other than its home network, the MSC queries an HLR that is outside of its network. Typically, an MSC determines the proper HLR to query based on the mobile identification number (MfN) transmitted by the wireless device.

Broadband packet networks represent another type of network. For example asynchronous transfer mode (ATM) networks have been developed to provide broadband transport and switching capability to Local Area Networks (LANs) and Wide Area Networks (WANs). Frame relay networks are another type of broadband packet network. Other types of broadband packet networks are possible as well.

For example, the Sprint Integrated On-Demand Network (ION) is a broadband network that is able to deliver a variety of services, such as voice, data, and video, to an end user at a residential or business location. The Sprint ION has a wide-area IP/ATM or ATM backbone that is connected to a plurality of local loops via multiplexers. Each local loop carries ATM over ADSL (Asymmetric Digital Subscriber Line) traffic to a plurality of Integrated Services Hubs (ISHs), which may be at either residential or business locations. Currently, ISHs do not provide wireless service.

The public switched telecommunications network (PSTN) is still another type of network. The PSTN includes switches, which can route both voice and data communications between end users. Typically, these switches are Class 5 switches.

Different types of networks are often connected to each other. For example, wireless networks can be connected to broadband networks. Both can be connected to the PSTN. There is a need to interconnect these different types of networks such that devices in one network can communicate with devices in other networks. A need exists to allow a wireless device (e.g., a PCS handset) to work as an on-net terminal device on a broadband network (e.g., the Sprint ION). It would also be desirable to provide wireless service to devices using an existing ISH. If a wireless coverage area is provided for an existing ISH, there is an additional need to hand-off calls as devices move from the small coverage area (of the ISH) to coverage areas of other wireless networks (and vice versa).

SUMMARY OF THE INVENTION

The present invention allows for a small wireless coverage area using an existing integrated services hub (ISH). The ISH may be connected to a service manager. Together, the ISH and service manager provide an interface, by which wireless devices coupled (via an air interface) to the ISH can communicate with devices in other networks.

In one embodiment of the present invention, the ISH provides a wireless coverage area, in which a user can employ a standard wireless telephone, such as a Sprint PCS telephone, to communicate with the ISH over an air interface. The ISH includes an antenna, an RF transceiver, vocoders, and other components to provide the ISH with the functionality of a CDMA base station controller (BSC). The ISH converts communications received from the wireless device into control and data signals having a format that is compatible for transmission on a broadband network.

Typically, the wireless coverage area provided by the ISH will be sufficient to include the home and yard area for a residential customer and the office area for a business customer but will not extend very far beyond these areas. Thus, the wireless coverage area may be termed a "pico-cell" or "EndoCell."

In an exemplary embodiment, the ISH is coupled to a broadband network. The broadband network is, in turn, coupled to a service manager, to a wireless network, and to the PSTN. The service manager is then coupled to both the wireless network and the PSTN.

The service manager receives control and data signals, via the broadband network, from the ISH and translates these signals into signaling communications, for example, SS-7 and IS-41 control signals. The SS-7 control signals are used to route communications through the PSTN. The IS-41 signals are used to perform hand-offs of wireless devices from the pico-cell to cells in the wireless network and vice versa.

In this way, an ISH provides a small wireless coverage area (the pico-cell). In addition, the service manager and ISH provide an interface between devices in the small coverage area and devices coupled to other networks. Finally, the ability of the service manager to provide hand-offs between the pico-cell and other cells in other networks allows a customer's wireless telephone to be used as both a home telephone and a mobile telephone for traveling.

These as well as other features and advantages of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which:

FIG. 7 is a block diagram showing the hand-off back process in accordance with an exemplary embodiment of the present invention.

DETAILED DESCRIPTION OF AN EXEMPLARY EMBODIMENT

Figure 1:
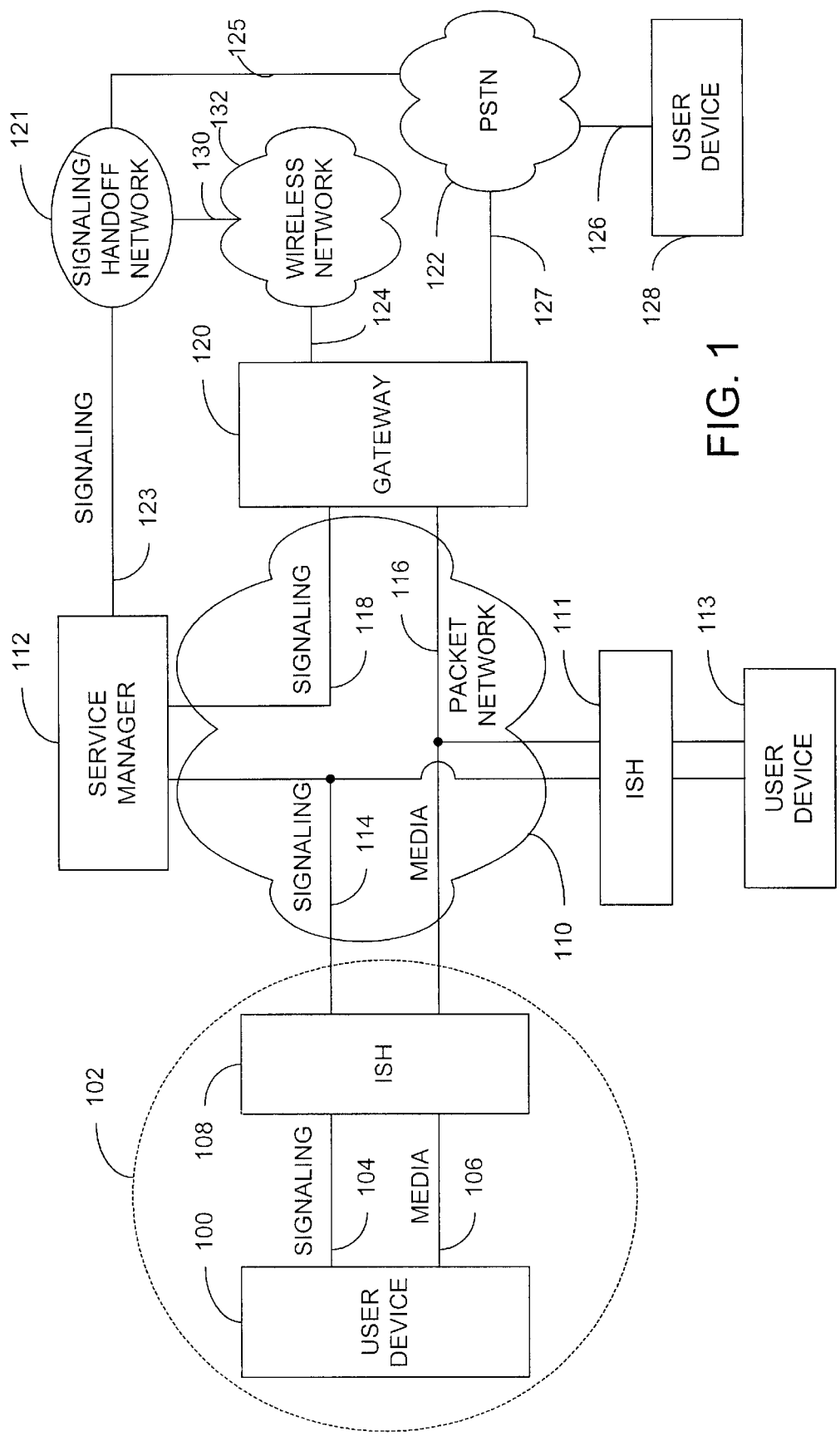
FIG. 1 is block diagram showing a plurality of interconnected networks using the integrated services hub (ISH) and service manager, in which an exemplary embodiment of the present invention can be implemented.

Referring now to FIG. 1, a block diagram showing a plurality of interconnected networks using the integrated services hub (ISH) and service manager is shown. A user device 100 is coupled to an integrated services hub (ISH) 108. The coupling is via a signaling channel 104 and a media channel 106. The signaling channel 104 and the media channel 106 are over an air interface. The user device 100 and ISH 108 are located in a cell 102.

The user device 100 can be any type of personal communication device that provides voice and/or data services to the user of the device. For example, the user device may be a Sprint PCS handset. However, the user device 100 can also be any device that a user accesses to input or retrieve voice messages or data, such as a personal computer or a hands-free speaker phone. If the user device 100 is a personal computer, the personal computer may be coupled to a data interface. The data interface may then be coupled to the ISH. Other examples of user devices and other connections and arrangements are possible.

The cell 102 is a cell used in, for example, a CDMA cellular phone system. Preferably, the wireless coverage area provided by the ISH will be sufficient to include the home and yard area for a residential customer and the office area for a business customer, but will not extend very far beyond these areas. Thus, the wireless coverage area may be termed a "pico-cell" or "EndoCell." Although shown as a smooth curve, the boundaries of the cell 102 may be irregular and overlap with the coverage areas of other cells. The coverage area of the cell 102 may be substantially outside the coverage area of the cells of other wireless networks. Alternatively, the coverage area of the cell 102 may be within the coverage area of cells of other wireless networks.

The ISH 108 receives signaling information over signaling channel 104 and voice signals over the media channel 106. Alternatively, the signaling information and voice signals may be over the same channel. The media channel 106 may also be used to transmit computer data, voice data, or video data. Other types data can be transmitted over the media channel, as well.

After receiving the signals, the ISH converts the signaling information and the voice signals into control and data signals. The control and data signals are in a format suitable for transmission over a broadband packet network 110. For example, the control and data signals may be in the form of ATM or IP packets.

The ISH 108 is coupled to a service manager 112 via a signaling link 114. The coupling is accomplished through the broadband packet network 110. The ISH 108 is coupled to a gateway 120 (also through the broadband packet network 110) via a media link 116. The service manager 112 is coupled to the gateway 120 by a signaling link 118.

The service manager 112 is coupled to a signaling and hand-off network 121 via signaling link 123. A second ISH 111 is coupled to the broadband network 110 via links 114 and 116. A second user device 113 is coupled to the second ISH 111. The user device 113 can be any type of device that allows a user to enter or retrieve data or voice messages, for instance.

The signaling and hand-off network 121 is coupled to a PSTN 122 via a signaling link 125 and to a wireless network 132 via a link 130. The gateway 120 is also coupled to the wireless network 132 via a communication link 124 and to the PSTN 122 by a communication link 127. A third user device 128 is coupled to the PSTN 122 via a communication link 126. The user device 128 can be any type of communication device including a telephone or computer. Other types of user devices are possible.

The wireless network 132 is any type of wireless network capable of communicating with a plurality of wireless devices. The wireless network 132 will typically be organized into a plurality of cells. The wireless network 132 comprises base stations, mobile switching centers (MSCs), and databases that contain information relating to the wireless devices in the wireless network such as the telephone numbers of these devices.

The service manager 112 issues signaling communications that control switches in the PSTN 122. The signaling communications manipulate these switches, which route voice information through the network. The service manager 112 uses a signaling protocol, for example, Signaling System 7, for this purpose.

SS-7 is a global standard for telecommunications defined by the International Telecommunications Union (ITU) Telecommunication Standardization Sector (ITU-T). The standard defines the procedures and protocols, by which network elements exchange information to effect wireless and wireline setup, routing, and control. In addition, variants of SS-7 exist such as those defined by the American National Standards Institute (ANSI), Bell Communications Research (Bellcore), and the European Telecommunications Standards Institute (ETSI). Of course, the signaling used in this invention is not limited to SS-7 or any particular type; the specific type of signaling used will depend on the exact nature and characteristics of the network and the applications desired.

The content of the signaling communications may include flags, length indicators, information fields, and check bits. Of course, the signaling communications may contain other information, as well. The signaling communications are used for call establishment and release. For example, when a call is to be routed from the broadband network to the PSTN, an initial address message (IAM) is formulated and sent from the service manager to a switching office in the PSTN. The IAM indicates the circuit used to transmit the call to the PSTN.

The service manager 112 also issues other signaling communications that are used by the wireless network 132, for example, signaling communications complying with the IS-41 specification. The IS-41 specification is used in wireless networks to provide services such as roaming, authentication, and hand-offs. Specifically, the intersystem hand-off function of IS-41.2-C, IS-41.5-C, IS.41.6-C of ANSSI/TIA/EIA-41 may be used, all of which are incorporated herein by reference. Of course, other specifications can be used in place of the IS-41 specification.

Specifically, the service manager 112 appears to the MSCs in the wireless network to be another MSC in the wireless network. The MSC uses existing databases in the wireless network 132 to make connections to the wireless device 100. A service profile for the wireless device 100 is placed in the databases of the wireless network 132. Thus, an MSC in the wireless network can communicate with a wireless device in the cell 102.

The management of the service profile may be distributed between the service manager 112 and MSCs in the wireless network 132. In other words, either the MSC or the service manager may place the service profile of the wireless device 100 in the databases of the wireless network 132. In addition, the service profile may be managed centrally by a dedicated server that is accessed via the signaling network.

When the user device 100 moves from the small coverage area of the ISH to a cell within the wireless network 132 (or vice versa), a hand-off occurs between the cell 102 and the cell within the wireless network 132. The service manager 112 negotiates with the MSCs in the wireless network 132 during hand-offs involving the user device 100. The negotiations decide whether and when a hand-off is needed. In addition, the negotiations exchange signal strength and frequency information, and all other types of information needed to complete a successful hand-off between cells.

Another function of the service manager 112 is to set up and control calls (placed at any user device) through the broadband network 110. For example, the service manager routes these calls from device 113, to ISH 111, to ISH 108, and to user device 100. Similarly, the service manager 112 may route these calls from user device 113 to ISH 111, to gateway 120, to either PSTN 22, or to user device 128. Of course, the service manager 112 may route these calls from user device 100 to user device 113 and user device 128 to user device 113. Other routings are possible.

The broadband packet network 110 is a packet network, for example, an ATM network such as the Sprint ION. Another example of a broadband network is an IP network. Other examples of broadband networks are possible. The broadband packet network 110 may comprise a series of switches. The broadband packet network 110 contains the functionality to route both voice signals and signaling/data through the network 110.

The PSTN 122 also comprises a series of switches. Illustratively, the PSTN 122 comprises Class 5 switches and is a TDM network. However, the PSTN 122 may comprise other types of switches and use other transmission technologies. Alternatively, the PSTN 122, which transmits voice messages, can be replaced by a network that transmits data, for example, the Internet.

The signaling and hand-off network 121 includes service control point (SCPs) and service transfer points (STPs). One purpose of the signaling and hand-off network 121 is to route signaling communications to the PSTN 122 and the wireless network 132.

One example of the operation of the interconnected networks and interface of FIG. 1 is as follows. A call is placed from the user device 100. The user device 100 transmits both signaling information (over the signaling channel 104) and media information (over the media channel 106). The signaling and media information is transmitted to the ISH 108. The ISH 108 converts this signaling information into control packets, which are transmitted over the broadband network 110 to the service manager 112 via the signaling link 114.

The ISH also converts the media information into media packets and transmits these media packets over the link 116 to the gateway 120. The gateway 120 transmits the media packets to the wireless network 132 or the PSTN 122 (depending upon the final destination of the call).

The service manager 112 may form signaling communications (e.g., using SS-7), which route the media packets input by the gateway through the wireless network 132 or the PSTN 122. For example, the signaling communications may route the media packets through the PSTN to the user device 126. Additionally, the service manager 112 may also form other signaling communications (e.g., using IS-41) and negotiate hand-offs between the cell 102 and cells within the wireless network 132 as the user device moves from cells within the wireless network 132 and the pico-cell 102.

Thus, the service manager 112 and ISH 108 cooperatively provide an interface between wireless devices residing in the pico-cell 102 and devices within cells of the wireless network 132. The option of communication with other networks, such as the PSTN, is also provided. The ability of the service manager 112 to negotiate with MSCs in the wireless network 132 allows hand-offs to occur between the pico-cell 102 and cells in the wireless network 132.

Figure 2:
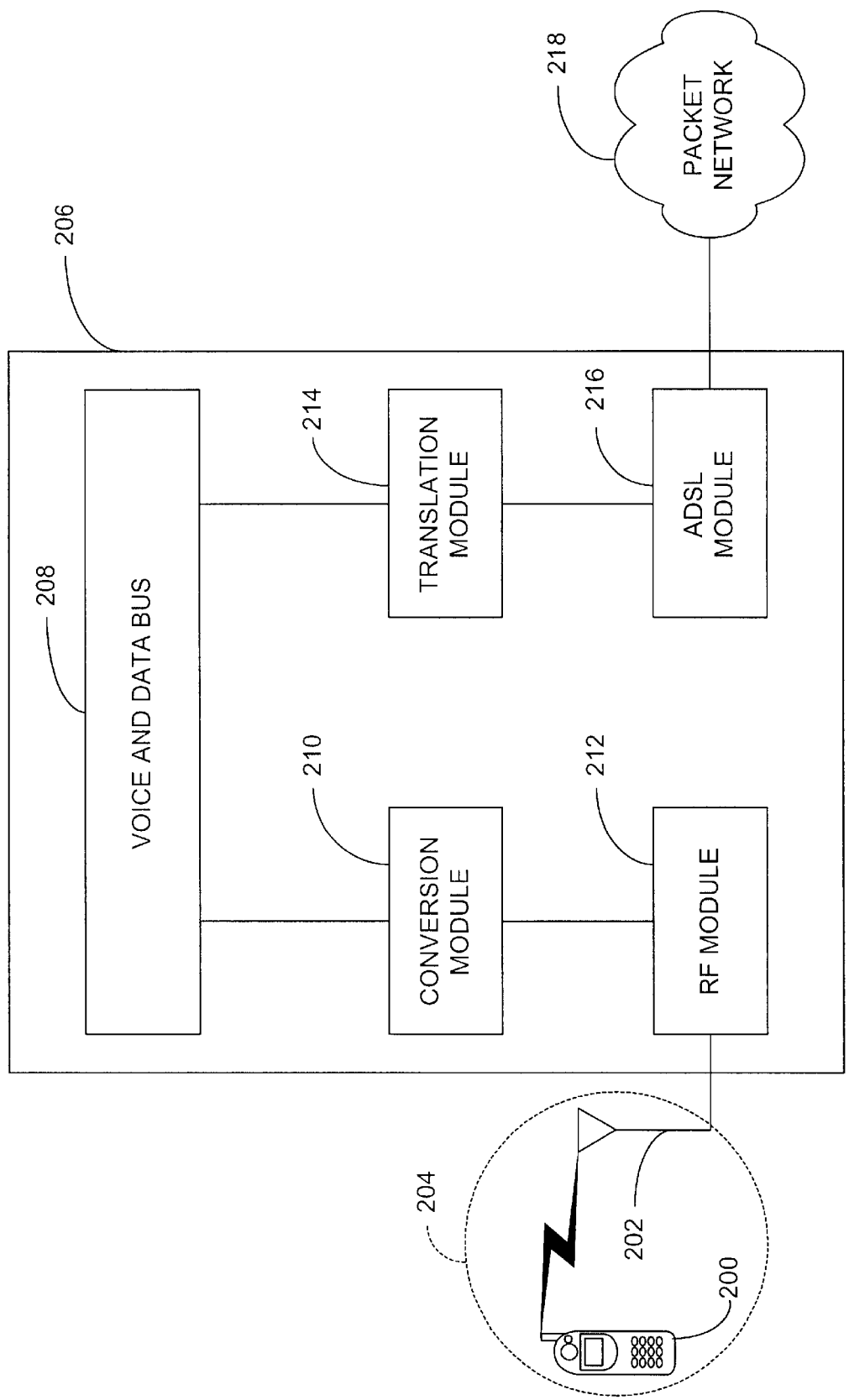
FIG. 2 is a block diagram of the integrated services hub (ISH) in accordance with an exemplary embodiment of the present invention.

Referring now to FIG. 2, a block diagram of the ISH is shown. A cellular telephone 200 is coupled via an air interface to an antenna 202. The cellular telephone 200 transmits voice and signaling information to the antenna 202 over a voice channel and a signaling channel. Alternatively, the voice and signaling information may be over the same channel.

The cellular telephone 202 is located within a cell 204. The area of the cell 204 represents the coverage area of the antenna 202. Illustratively, the cell 204 is an endocell or pico-cell that has a coverage area extending over a small geographical area, for example, over a house.

An integrated services hub (ISH) 206 comprises the antenna 202, an RF module 212, a conversion module 210, a voice and data bus 208, a translation module 214, and an ADSL module 216. The antenna is coupled to the RF module 212. The RF module 212 is coupled to the conversion module 210. The conversion module 210 is coupled to the voice and data bus 208. The voice and data bus 208 is coupled to the translation module 214. Finally, the translation module 214 is coupled to the ADSL module 216.

The RF module 212 comprises an RF receiver, which receives voice and signaling information over the voice and signaling channel. The RF receiver is tuned to receive RF signals within a certain frequency bandwidth. For example, the RF receiver may be tuned to receive signals in the 1900 MHz bandwidth.

The conversion module 210 converts the information transmitted over the voice channel and signaling channel (received from the RF module) into separate information streams, which can be processed later. For example, the conversion module 210 separates communications received over the voice channel and the signaling channel into a PCM voice stream and a signaling/data stream, respectively.

The voice and data bus 208 is an internal bus, which couples the conversion module 210 to the translation module 214. The voice and data bus 208 transmits the voice and signaling streams formed in the conversion module 210.

The translation module 214 translates the voice stream and the data stream received over the bus 208 into ATM cells. For example, the translation module 214 may encapsulate the voice stream received over the voice and data bus 208 into AAL-2 cells. The translation module may also translate the signaling stream received from the voice and data bus 208 into SGCP (over AAL-5) cells.

The ADSL module 216 provides asymmetrical digital subscriber line (ADSL) connection to the broadband packet network. The ADSL module 216 provides highspeed access to the broadband network.

The cellular telephone 200 communicates through the CDMA network to the ISH 206. The cellular telephone 200 transmits voice and signaling information to the ISH 206. The ISH 206 converts (translates) the voice and signaling information received from the cellular telephone 200 into signals useable by the packet network 218, for example, into packets. The packets are transmitted by a service manager to other networks, such as wireless networks and the PSTN.

Figure 3:
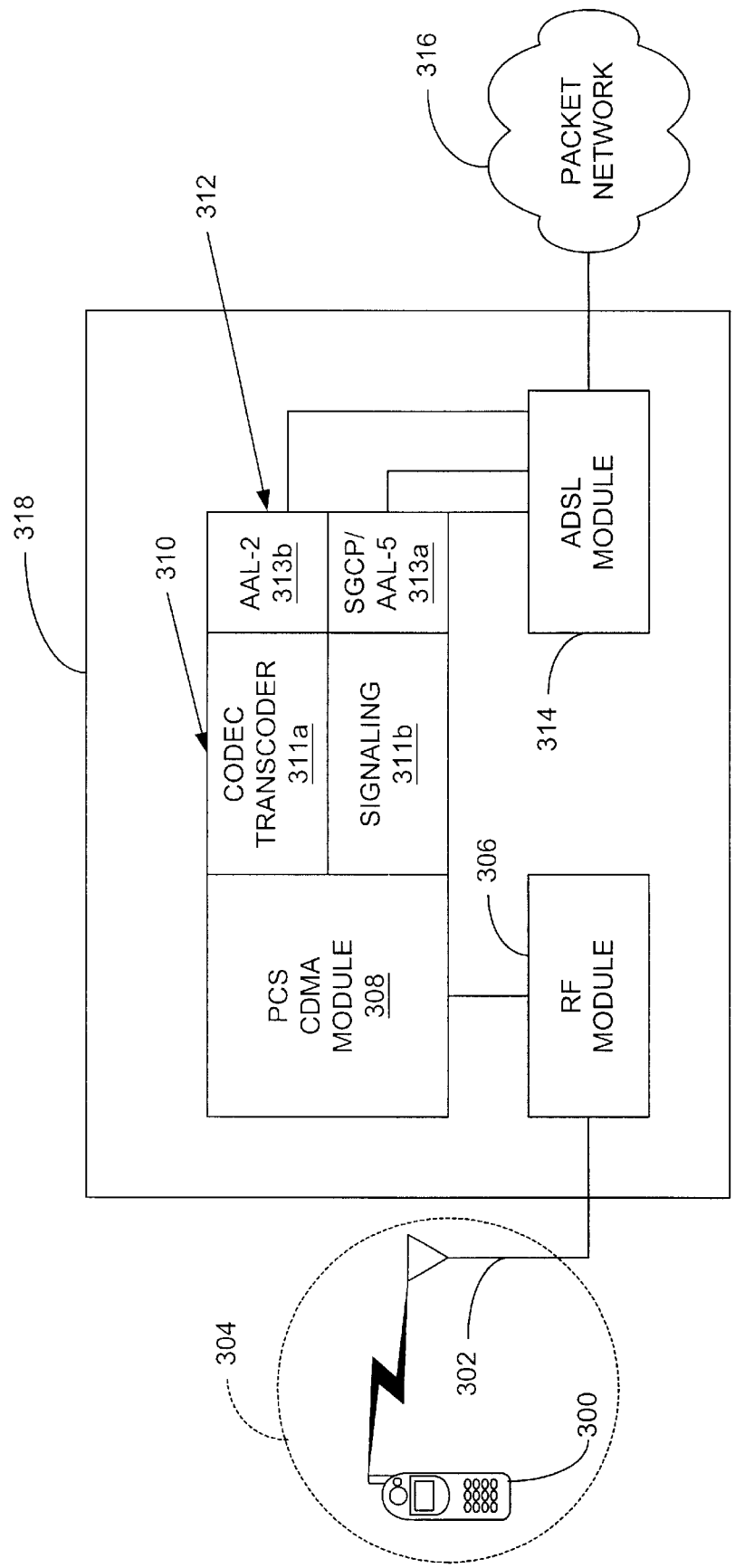
FIG. 3 is a block diagram of the integrated services hub (ISH) in accordance with an exemplary embodiment of the present invention.

Referring now to FIG. 3, a block diagram of another embodiment of the ISH is shown. A cellular phone 300 is coupled over an air interface to an integrated services hub (ISH) 318. The coupling is accomplished via an antenna 302 and an air interface. The cellular phone 300 transmits voice and signaling information to the antenna 302 via a voice channel and a signaling channel. Alternatively, a single channel may be used.

The ISH comprises the antenna 302, RF module 306, PCS CDMA module 308, bus 310, interface module 312 and ADSL module 314. The antenna is coupled to the RF module 306. The RF module 306 is coupled to the PCS CDMA module 308. The PCS CDMA module 308 is coupled to the bus 310. The bus 310 includes a Codec transcoder 311a and a signaling and data channel 311b.

The bus is coupled to the interface module 312. The interface module comprises an SGCP/AAL-5 module 313a and an AAL-2 module 313b. Specifically, the transcoder 311a is coupled to the AAL-2 module 313b and the signaling and data channel 311b is coupled to the SGCP/AAL-5 module 313a. The interface module 312 is coupled to the ADSL module 314.

The cellular phone 300 is any type of cellular telephone such as a Sprint PCS handset. Alternatively, other types of wireless devices, such as pagers or computers (having wireless access), may be used.

The RF module 306 comprises a RF receiver, which receives information over the voice channel and the signaling channel. The RF receiver is tuned to receive RF signals within a certain frequency bandwidth. For example, the RF receiver may be tuned to receive signals in the 1900 MHz bandwidth.

The PCS CDMA module 308 converts the information transmitted over the voice channel and signaling channel (and received from the RF module) into a PCM voice stream and a signaling stream. The PCS CDMA module comprises a codec, which converts voice signals from the RF module 306 into digital bit streams. The codec also performs the reverse function. In one example, the codec may be as IS-127 codec.

The transcoder 311a translates voice bits streams from the format of the PCS CDMA module 308 (e.g., IS-127) into the format of the AAL-2 module 312 (e.g., G.711). The transcoder 311a also provides the reverse functionality. The signaling channel 311b transmits signaling information to the SGCP/AAL-5 module 313a and vice versa.

The SGCP/AAL-5 module 313a converts the signaling information received over the signaling channel 311b into AAL-5 cells. The AAL-2 module 313b converts the PCM voice information received over the PCM voice channel 311a into AAL-2 cells. The AAL-2 module 313b includes a codec, which converts analog signals from the ADSL module 314 into a digital bit stream. The codec also performs the reverse function. In one example, the codec is a G.711 codec.

The ADSL module 314a provides asymmetrical digital subscriber line (ADSL) connection to the network, which is a high-speed connection. The ADSL module is connected to a broadband packet network 316.

The broadband packet network 316 can be the Sprint ION. The Sprint ION also includes gateways for connecting to other networks. In particular, the Sprint ION includes trunk gateways for connecting to circuit-switched pathways in the PSTN, signaling gateways to wireless networks, and signaling gateways to connect to the Internet.

Figure 4:
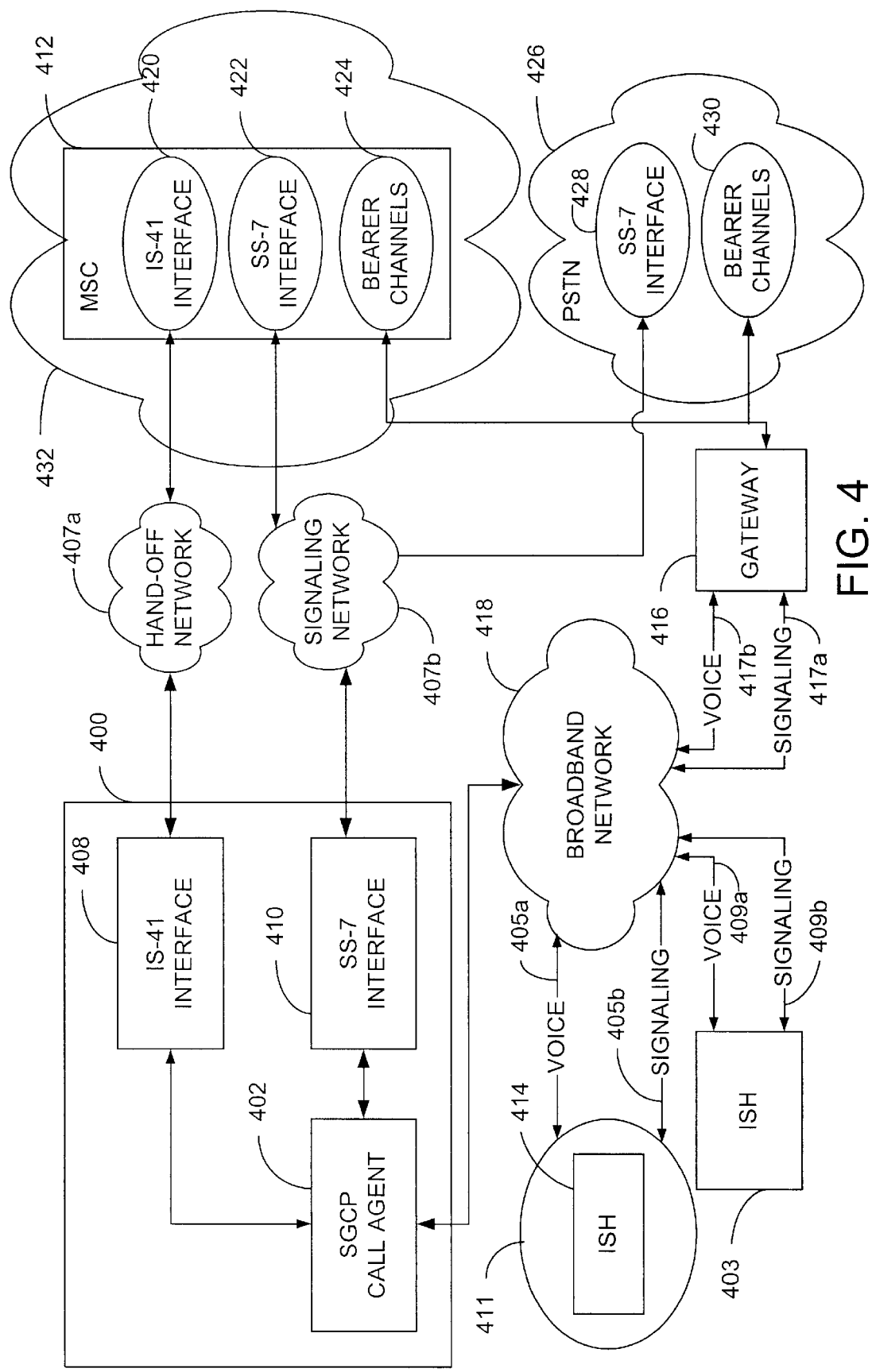
FIG. 4 is a block diagram of the service manager in accordance with an exemplary embodiment of the present invention.

Referring now to FIG. 4, the operation of the service manager is now described. A service manager 400 includes an SGCP call agent 402, an IS-41 interface 408, and an SS-7 interface 410. The SGCP call agent 402 is coupled to the IS-41 interface 408 and to the SS-7 interface 410.

The IS-41 interface 408 is coupled to a hand-off network 407a. The hand-off network 407a is coupled to an IS-41 interface 420. The SS-7 interface 410 is coupled to a signaling network 407b. The signaling network 407b is coupled to an SS-7 interface 422 in an MSC 412. The MSC 412 is in a wireless network 432. The signaling network 407b is also coupled to an SS-7 interface 428 in the PSTN 428.

An ISH 414 resides within a pico-cell 411. The ISH is coupled to a broadband network 418. The coupling is via a voice channel 405a and a signaling channel 405b. A second ISH 403 is also coupled to the broadband network 418. The coupling is via a voice channel 409a and a signaling channel 409b. The broadband network 418 is coupled to the SGCP call agent 402 (with the service manager 400). The broadband network is also coupled to a gateway 416 via a signaling channel 417a and a voice channel 417b. The gateway 416 transmits voice information over bearer channels 424 (within the MSC 412), over bearer channels 430 (within the MSC 430), and is also coupled to the SGCP call agent 402. The bearer channels shown in FIG. 4 are virtual connections rather than physical connections.

The broadband network 418 may include routers and switches (not shown). The routers and switches receive packets of information with IP addresses and route the packets (using the IP address) to the appropriate destination. For example, if a first ISH attempts to dial a second ISH, the destination address will be the address of the second ISH.

The ISH transmits SGCP control signals to the SGCP control agent 402 via the broadband network 418. The ISH also transmits voice information to the broadband network 418. The voice information is routed by the broadband network 418 to the appropriate destination. The destination may be the second ISH, the PSTN, or the wireless network. If the destination is the PSTN 428 or the wireless network, then the voice information passes through the gateway.

The SGCP control signals are in the form of packets, for example, IP packets. The SGCP call agent 402 converts the SGCP control signals from the SGCP format into formats compatible with the SS-7 and IS-41 specifications. These converted signals are transmitted to the IS-41 interface 408 and the SS-7 interface 410. The IS-41 interface 408 and SS-7 interface 410 create signaling communications consistent with the IS-41 and SS-7 specifications, which are transmitted to the wireless network 432 and the PSTN 426 via the hand-off network 407*a* and the signaling network 407*b*.

The SGCP call agent 402 also transmits signaling information to the gateway 416. For example, the call agent 402 may signal the gateway to produce dial tone and or the call agent may send digit information to the gateway 416. The gateway 416 passes voice information to the wireless network 432 and the PSTN 428 via the bearer channels 424 and 430, respectively.

The IS-41 interface 420 in the MSC 412 coordinates hand-offs between wireless devices moving between cells in the wireless network 432 and the cell 411. The interface 420 negotiates with the service manager 400 to decide whether and when a hand-off is needed. In addition, the service manager 400 and MSC 412 exchange signal strength and frequency information, and all other types of information needed to complete a successful hand-off between the cell 411 and cells within the wireless network 432.

The SS-7 interfaces 422 and 428 receive signaling communications from the service manager 400. The SS-7 interface 422 takes the signaling communications from the service manager and uses these communications to route voice information over bearer channel 424 through the wireless network. Similarly, the SS-7 interface 428 uses these communications to route voice information over the bearer channel 430 through the PSTN 426. The bearer channels 424 and 430 transport data or voice information across the wireless network 432 and 426, respectively.

The IS-41 interface 408 provides signaling communications to the wireless network 432 in the form of IS-41 signals. The SS-7 interface 410 provides signaling communications to the signaling network 412.

Figure 5:
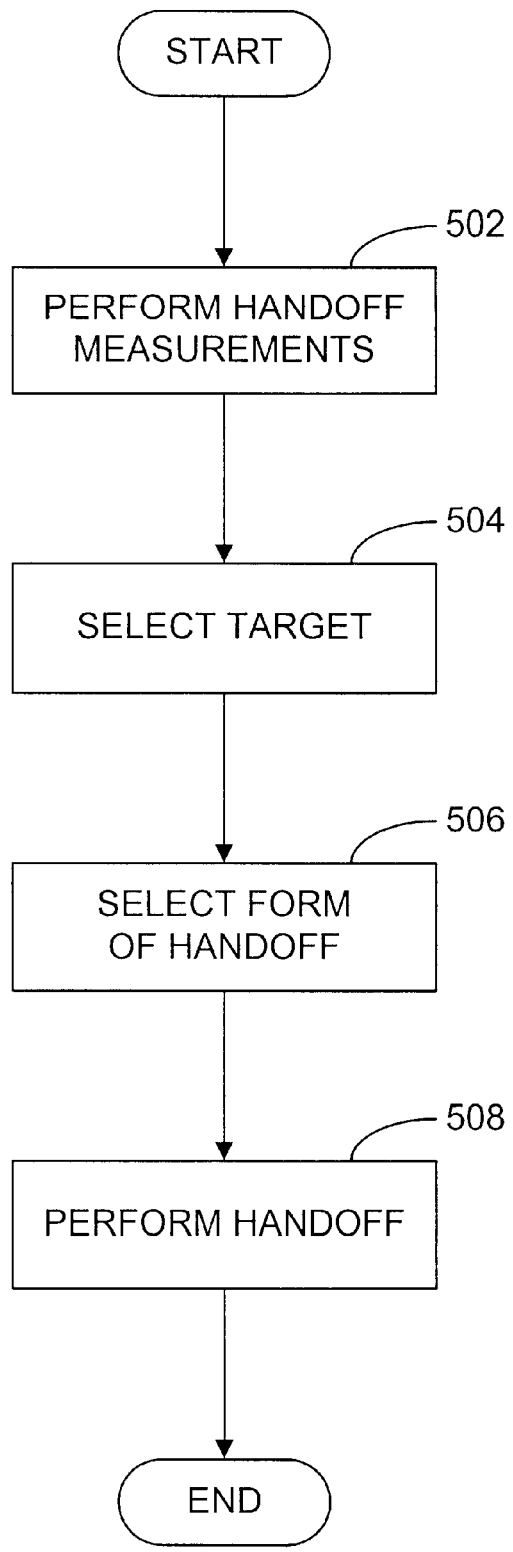
FIG. 5 is a flowchart illustrating the hand-off process in accordance with an exemplary embodiment of the present invention.

Referring now to FIG. 5, the hand-off interface between a service manager and an MSC is described. Either the MSC or the service manager can perform the following functions.

At step 502, hand-off measurements are made by the serving MSC (or service manager). Hand-off measurements determine whether a hand-off is appropriate. In addition, the measurements identify particular MSCs or service managers ("the candidate MSCs"), which should be considered for the hand-off. Further, the measurements evaluate all candidate MSCs (or service managers) to see if each candidate MSC (or service manager) is suitable to accept the call.

At step 504, a candidate MSC (or service manager) is selected. Next, at step 506, the form of the hand-off is determined. If the candidate MSC (or service manager) is already involved in the call and connected to the serving MSC (or service manager) via an inter-MSC circuit, a hand-off back is used. Otherwise, a hand-off forward or path minimization may be attempted. At step 508, the hand-off is performed. Execution then ends.

Figure 6:
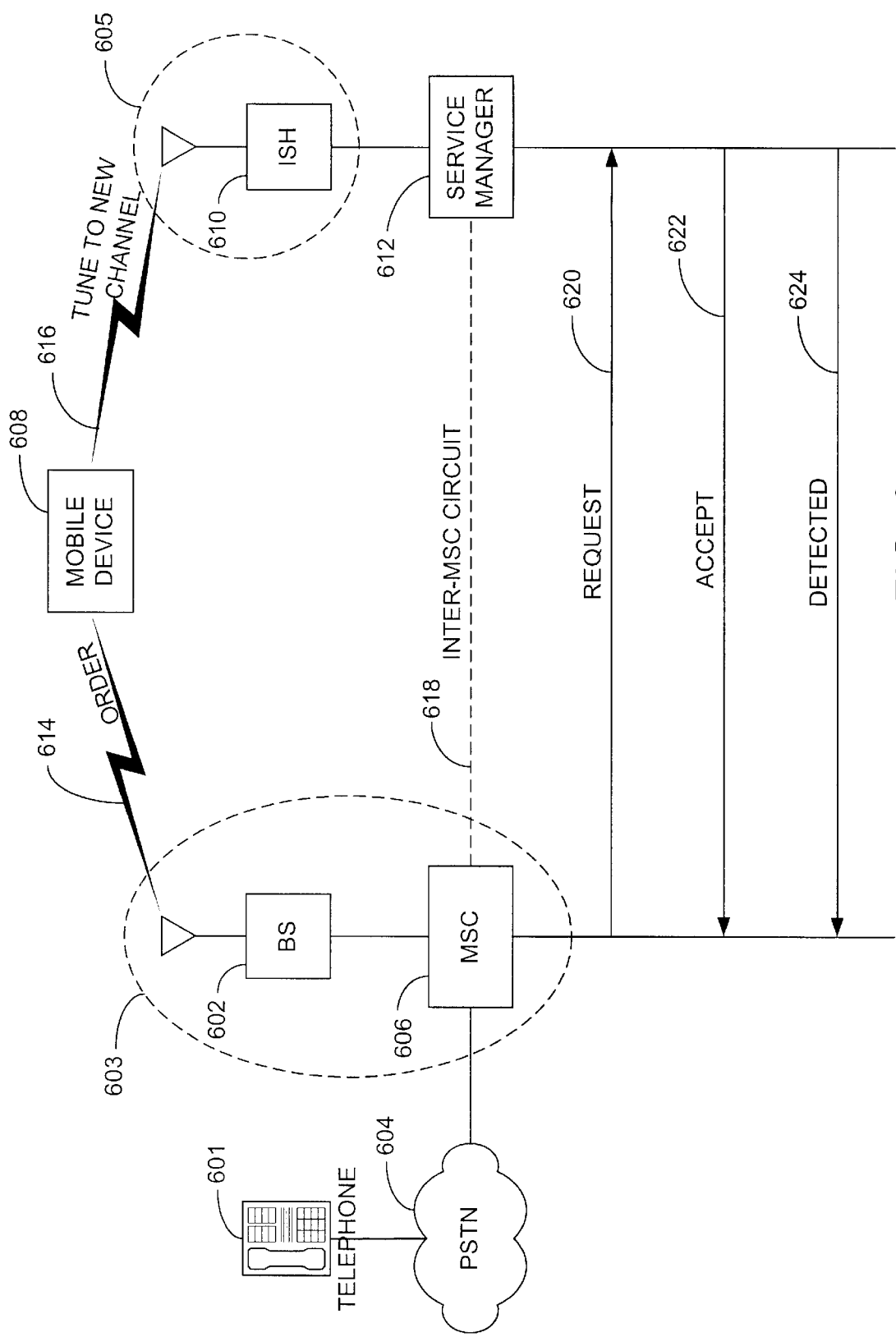
FIG. 6 is a block diagram showing the hand-off forward process in accordance with an exemplary embodiment of the present invention.

Referring now to FIG. 6, one example of the hand-off forward process between an MSC and a service manager is described. A phone 601 is coupled to PSTN 604. PSTN 604 is coupled to an MSC 606. The MSC 606 is coupled to a base station 602. The base station 602 is coupled via an air interface to a mobile device 608. The mobile device 608 is moving between a cell 603 and a pico-cell 605. The mobile device 608 is coupled via an air interface to an ISH 610, which is in the pico-cell 605. The ISH 610 is coupled to a service manager 612 via a broadband network (not shown). An inter-MSC circuit couples the MSC 606 to the service manager 612. In this example, it is assumed that a connection between the phone 601 and mobile device 608 is desired. It is also assumed that a hand-off measurement process has determined that a hand-off forward should occur between the MSC 606 and the service manager 612.

The MSC 606 issues a request 620 for a hand-off forward to the service manager 612. The service manager 612 issues an acceptance 622 to the MSC 606. The inter-MSC circuit is now ready for the hand-off. The MSC issues a hand-off order 614 to the mobile device 608. The mobile device 608 tunes to the new channel 616. The service manager issues a detection response 624 to indicate to the MSC 606 that the mobile has been detected by the service manager 612. The service manager 612 connects the call path from the MSC 606 (over the inter-MSC circuit 618) to the service manager 612.

Referring now to FIG. 7, one example of the hand-off back process between an MSC and the service manager is described.

A phone 701 is coupled to PSTN 704. PSTN 704 is coupled to an MSC 706. The MSC 706 is coupled to a base station 702. The base station 702 is coupled via an air interface to a mobile device 708. The mobile device 708 is moving between a cell 703 and a pico-cell 705. The mobile device 708 is coupled via an air interface to an ISH 710, which is located in the pico-cell 705. The ISH is coupled to the service manager via a broadband network (not shown). An inter-MSC circuit couples the MSC 706 to the service manager 712. In this example, it is assumed that a connection between the phone 701 and mobile device 708 is desired. It is also assumed that a hand-off measurement process has determined that a hand-off back should occur between the service manager 712 and the MSC 706.

The service manager 712 issues a handback request 720 for a hand-off back to the MSC 706. The MSC 706 issues an acceptance 722 to the service manager 712. The service manager 712 issues a hand-off order 716 to the mobile device 708. The mobile device 708 tunes to the new channel 714. The MSC 706 issues a release request 724 to the service manager 712, which requests the release of the unnecessary inter-MSC circuit 718. The service manager issues a release acknowledgement 726 and the inter-MSC circuit is released and can be used for other hand-offs.

It will be realized that the hand-off processes described in relation to FIGS. 6 and 7 are for illustrative purposes only. Other hand-off processes with different message flows are possible.

As in most telecommunications applications, those skilled in the art will appreciate that many of the elements described herein are functional entities that may be implemented as discrete components, in any suitable combination and location. Further, various functions described herein as being performed by one or more entities may be carried out by a processor executing an appropriate set of machine language instructions stored in memory. Provided with the present disclosure, those skilled in the art can readily prepare appropriate computer instructions to perform such functions.

Exemplary embodiments of the present invention have been illustrated and described. It will be understood, however, that changes and modifications may be made to the invention without deviating from the spirit and scope of the invention, as defined by the following claims.

We claim:

1. An interface between a public switched telephone network (PSTN), a wireless communication network, and a wireless device, said wireless communication network having a plurality of cells and a plurality of mobile switching centers (MSCs), each of said plurality of cells having a coverage area, said interface comprising:

a broadband packet network;

an integrated services hub (ISH), said ISH communicatively coupled to said wireless device and said broadband packet network, said ISH receiving RF signaling and media information from said wireless device and converting said RF signaling and media information into control and media packets usable by said broadband packet network, said ISH transmitting said control and media packets over said broadband packet network, said ISH having an antenna with a first coverage area extending over a pico cell; and a service manager communicatively coupled to said broadband packet network, to said wireless network, and to said PSTN, said service manager receiving said control packets from said ISH via said broadband packet network and forming and providing signaling communications in response to receiving said control packets, said signaling communications controlling the operation of switches in said PSTN, said service manager communicating with selected ones of said plurality of MSCs in said wireless network to perform hand-offs of said wireless device from said first coverage area to a selected one of said plurality of cells within said wireless network.

2. The interface of claim 1 wherein said hand-offs are performed using the IS-41 protocol.

3. The interface of claim 1 wherein said signaling communications utilize the SS-7 protocol.

4. The interface of claim 1 wherein said broadband packet network is coupled to a gateway, said gateway being further coupled to said PSTN and said wireless network.

5. The interface of claim 1 further comprising a plurality of ISHs, said plurality of ISHs being coupled to said broadband packet network.

6. The interface of claim 4, wherein said ISH transmits said media packets to said gateway via said broadband packet network.

7. The interface of claim 1, wherein said media information includes voice information.

8. A method for interfacing a wireless device, a wireless network having a plurality cells and a plurality of mobile switching centers (MSCs), each of said cells having a coverage area, and a public switched telephone network (PSTN), wherein said wireless device is positioned within a pico cell, said pico cell having a coverage area, the method of interfacing comprising the steps of:

receiving wireless communication signals representative of communications from said wireless device;

converting said wireless communication signals into control signals and media information, said media information including voice information;

transmitting said control signals and media information in a packet format over a broadband packet network;

using said control signals to route said media information sequentially through said broadband packet network to said PSTN;

converting said control signals to signaling communications;

using said signaling communications to route said media information through said PSTN and said wireless network; and performing hand-offs of said wireless device from said pico cell to a selected one of said plurality of coverage areas within said wireless network and vice versa.

9. The method of claim 8 wherein said step of performing hand-offs utilizes the IS-41 protocol.

10. The method of claim 8 wherein said signaling communications conform to the SS-7 protocol.

11. A computer readable medium having stored therein instructions for causing a processing unit to execute the method of claim 8.

12. The method of claim 8, further comprising:

making a hand-off measurement to determine whether a hand-off from said pico cell to a selected one of said plurality of coverage areas within said wireless network is appropriate.

13. The method of claim 12, further comprising:

selecting a candidate MSC for said hand-off from said pico cell.

14. An interface between a wireless device, a wireless network, and a public switched telephone network, wherein said wireless device is positioned in a pico cell, said pico cell having a coverage area, wherein said wireless network has a plurality of coverage areas, said interface comprising:

means for receiving wireless communication signals representative of communications from said wireless device;

means for converting said wireless communication signals into control signals and media information, said media information including voice information. and for transmitting said control signals and media information in a packet over a broadband packet network;

means for using said control signals to route said media information sequentially through said broadband packet network to said PSTN;

means for converting said control signals to signaling communications; and means for using said signaling communications to route said media information through said PSTN and said wireless network.

15. The interface of claim 14 further comprising means for performing hand-offs of said wireless device from said pico cell to a selected one of said plurality of coverage areas within said wireless network and vice versa.

16. The interface of claim 15 wherein said means for performing hand-offs utilizes the IS-41 protocol.

17. An interface between a public switched telephone network (PSTN), a wireless communications network, and a wireless device, wherein said wireless communication network has a plurality of cells and a plurality of mobile switching centers (MSCs), each of said cells having a coverage area, said interface utilizing a broadband packet network and comprising:

an integrated services hub (ISH), said ISH communicatively coupled to said wireless device and said broadband packet network, said ISH receiving RF signaling and media information from said wireless device and converting said RF signaling and media information into control and media packets usable by said broadband packet network, said ISH transmitting said control and media packets over said broadband packet network, said ISH having an antenna with a first coverage area extending over a pico cell; and a service manager communicatively coupled to said broadband packet network, to said wireless network, and to said PSTN, said service manager receiving said control packets from said ISH via said broadband packet network and forming and providing signaling communications in response to receiving said control packets, said signaling communications controlling the operation of switches in said PSTN.

18. The interface of claim 17, wherein said media information includes voice information.

19. A system for interfacing between a pico cell, a wireless network and a public switched telephone network, wherein said pico cell has an associated wireless device, and said wireless network includes a plurality of cells, said system comprising:

means for receiving control signals and media signals, said control signals and media signals being representative of communications from said wireless device;

means for converting said control signals into signaling communications;

means for using said control signals to route said media signals in a packet format through a broadband packet network; and means for handing-off calls from a selected one of said cells in said wireless network to said pico cell.

20. The system of claim 19, wherein said media signals include voice signals.

* * * * *